Aug. 29, 1933.  H. D. GUMPPER  1,924,851
ELECTRIC VEHICLE
Filed Aug. 2, 1929
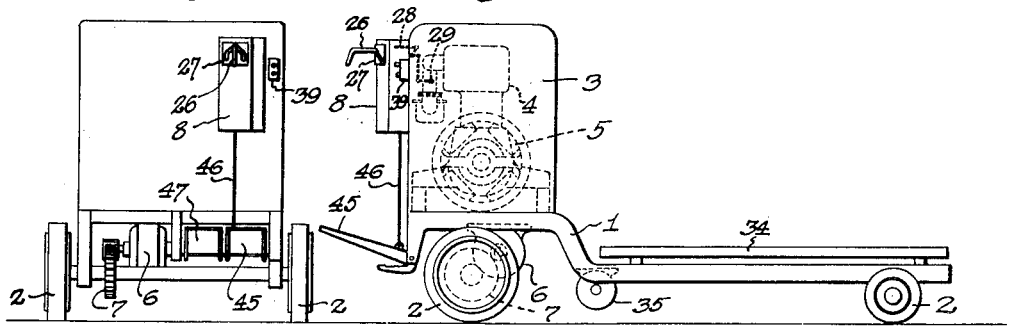
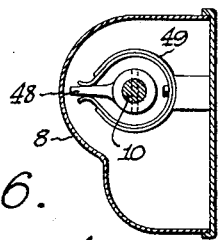
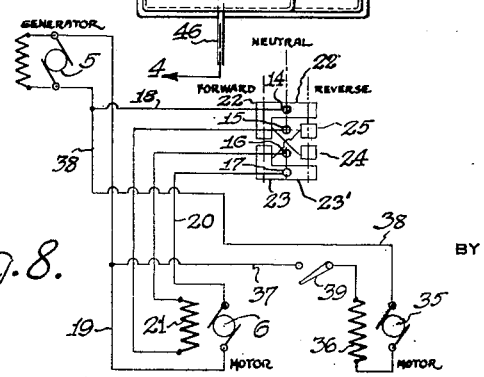
INVENTOR
Harold D. Gumpper,
BY
ATTORNEYS Patented Aug. 29, 1933

1,924,851

UNITED STATES PATENT OFFICE 1,924,851

ELECTRIC VEHICLE

Harold D. Gumpper, Detroit, Mich., assignor to Marjorie Teakle Gumpper, Detroit, Mich.

Application August 2, 1929. Serial No. 383,106

5 Claims. (Cl. 290—17)

The present invention pertains to improvements dealing with the operation of electrical vehicles which obtain their electrical energy from an internal combustion engine or other form of prime mover and an electric generator driven thereby.

The principal object of the invention is to provide means for controlling the speed and direction of travel of the vehicle through one control handle. The invention also includes appliances to safeguard the vehicle against starting by meddlers unfamiliar with its operation.

The mechanism for accomplishing these purposes is provided in a controller having a fixed and movable element for making the proper electrical connections to control the direction of travel of the vehicle. A controller handle is attached to the movable element for changing its position relative to the fixed element. This handle is also arranged to move at right angles to the direction of motion above described and by this latter movement the speed of the vehicle is controlled through suitable linkage connected with the throttle valve of the prime mover. In order to restrain the above motions of the controller handle and properly combine the functions of speed and direction of travel as determined by the controller mechanism, a slotted guide plate is provided through slots in which the controller handle extends. This slotted guide plate is rigidly secured to the stationary element of the controller. A spring device is provided for returning the movable element of the controller to a central position relative to the fixed element. A second spring is provided for holding the conetroller handle in a restrained position at right angles to the action of the first spring. In this restrained position the throttle of the prime mover is partially closed and the engine speed held so low that practically no voltage is generated. Pressure tending to compress this spring opens the throttle and increases the generator voltage increasing the vehicle speed at the option of the operator.

In order to safeguard the vehicle against operation by meddlers an interlocking mechanism is provided which by means of suitable linkage connected between the operator's seat or platform on which he stands and the movable element of the controller locks this movable element in a neutral position except when the operator is in the proper position on the vehicle and his weight releases the interlocking mechanism.

In the description which follows and in the drawing a vehicle of the type used about large factories, railroads, etc., is shown but the application of this invention is not limited to vehicles of this type but may be applied to street vehicles for the transportation of passengers and freight, vehicles intended to operate on rails, or any type wherein electric motors are used in conjunction with a prime mover in combination with electric generators.

The invention is fully disclosed by way of example in the following description and in the accompanying drawing in which—

Figure 1 is a side elevation of the truck;

Fig. 2 is a front view thereof;

Fig. 3 is an elevation of the controller, showing one operating lever in section;

Fig. 4 is a section on the line 4—4 of Fig. 3;

Figs. 5, 6 and 7 are sections on the lines 5—5, 6—6, and 7—7 respectively of Fig. 4; and Fig. 8 is a wiring diagram.

Reference to these views will now be had by use of like characters which are employed to designate corresponding parts throughout.

The truck comprises a chassis 1 running on wheels 2 and carrying a housing 3 for the power generating apparatus. This apparatus consists of an internal combustion engine 4 and a generator 5 geared thereto. The chassis 1 further supports a driving motor 6 which is supplied with current from the generator 5 in various ways which will presently be described. The driving motor is geared to the front wheels 2 as indicated by the numeral 7 in Fig. 2.

On the outside of the housing 3 is supported a casing 8 for containing a controller which governs the motive connection between the generator 5 and driving motor 6. A pair of bearings 9 within the casing 8 support a shaft 10 which carries a drum 11 constituting the movable element of the controller. To the rear wall of the casing 8 is secured an insulating block 12 carrying four spring arms 13 which in turn hold four arcuate contact members 14, 15, 16 and 17 in spring pressed engagement with the drum 11.

The contact 14 is joined by a conductor 18 to one side of the generator 5, the other side of the generator being connected by a line 19 to one side of the motor 6. The other side of the motor is connected by a conductor 20 to the contact 17. The field winding 21 of the motor 6 is in series with the contacts 15 and 16 as clearly shown in Fig. 8.

The drum 11 carries two spaced conducting strips 22 and 23 lying in line longitudinally of the drum. On turning of the drum to a given position, the former strip is adapted to bridge the contacts 14 and 15 and the latter to bridge the contacts 16 and 17. The drum further carries a pair of smaller contacts 24 and 25 which are cross connected to the strips 22 and 23 respectively. These contacts are so positioned as to engage the contacts 16 and 15 respectively on a given adjustment of the drum.

To the upper end of the shaft 10 is pivotally attached a drum operating lever 26. The housing 3 carries a slotted guide plate 27 through which the lever passes. At the inner end of the lever is a finger 27 from which a suitable linkage 28 extends to the throttle 29 of the engine 4 or to any other device which might govern the output of the source of current supply. A spring 30 at the pivoted end of the lever tends to raise the latter, and the linkage 28 is such that the element controlled thereby is in a neutral or idling condition when the lever 26 is raised.

The slot in the plate 27 is of an inverted W-shape having diverging end branches 31 and 32 angular to the axis of the drum, and its center branch 33 parallel to said axis. When the lever 26 is brought to the bottom of the slot 31, the strips 22 and 23 are in engagement with the fixed contacts. Current thus flows in a circuit through the generator and motor. The several contacts are so positioned that, in this adjustment of the controller, the motor is driven forwardly. In order to reverse the drive, the lever 26 is brought to the bottom of the slot 32. The controller is thereby turned to bring the contacts 24 and 25 into engagement with the contacts 16 and 15 respectively. The strips 22 and 23 separate from the contacts 15 and 16 respectively, but the circumferential legs 22' and 23' remain, however, in engagement with the contacts 14 and 17 respectively. The current is thus reversed since, instead of a direct connection between contacts 14 and 15, there is a connection from contact 14 through strip 22 to contact 24 and then to contact 16, while the direct connection between contacts 16 and 16 is likewise replaced by a path between contacts 15 and 17.

The chassis 1 also carries a movable floor 24 adapted to be raised by a lifting motor 35. Because of the adjustability of the floor, it may be moved beneath a load which is supported on skids for example, and then raised to lift the load from its support. The lifting motor 35 is in series with the field coil 36 which in turn is connected by a conductor 37 to the line 19. The remaining side of this motor is joined by a conductor 38 to the conductor 18. In one of these conductors is inserted a manual control switch 39 preferably carried at the forward part of the housing 3.

The positioning of the lever 26 at the intersection between the branches 31 and 32 or anywhere in the branch 33 determines the neutral or circuit-breaking position of the controller. Thus, as the lever is moved to forward or reverse position, it is also swung on its pivotal connection with the shaft 11 and thus caused to operate the linkage 28 so that the device controlled by the linkage in turn brings about a definite speed of the generator at the time the respective connections are completed. In like manner the lever may be worked in the branch 33 while the controller is in neutral position to govern the power applied to the floor 34 while the truck is at rest or coasting.

The lower end of the shaft 11 carries a block 40 as shown more clearly in Fig. 5. To a bracket 41 which is secured to the rear wall of the casing 34 is pivotally attached a yoke 42 adapted to straddle the block 40 and thus lock the movable element of the controller against turning. A spring 43 connects one end of the yoke to a fixed member 44 and normally tends to pull the yoke into locking position.

To the forward part of the chassis 1 is pivotally attached a pedal 45 connected to the yoke 42 by a link 46. In order to operate the controller it is necessary to apply a weight on the pedal 45. The chassis 1 also carries a similar pedal 47 adjacent the pedal 45 and linked to a brake mechanism (not shown) which normally locks the wheels and which releases them when the pedal is depressed. The operator must stand on both pedals in order to run the truck, and the truck is rendered inoperative when the operator leaves this position. Thus, the apparatus cannot be propelled by a person meddling with the lever 26 without standing on both pedals.

From the lower part of the shaft 10 extends a finger 48 engaged at opposite sides by the ends of a curved spring 49 suitably supported from the back of the casing 8. This spring tends to return the lever 26 to neutral position when withdrawn from the straight locking ends 31' and 32' of the branches 31 and 32 respectively. In co-operation with the spring 30 which tends to lift the lever out of the straight slots 31', 32' and 33, the spring 49 functions to return the lever to withdrawal position under all conditions.

Although a specific embodiment of the invention has been illustrated and described, it will be apparent that various alterations in the details of construction may be made without departing from the scope of the invention as indicated by the appended claims.

What I claim is:—

1. An electric vehicle comprising a wheeled chassis, a generator thereon, means for driving said generator, a driving motor geared to the wheels of said vehicle and connected to said generator, a controller having fixed elements connected to said generator and motor and having a movable element adapted to make, break and reverse a circuit through said generator and motor, an operating lever pivotally attached to said movable element and movable rigidly with said movable element for adjusting the same to make, break, or reverse the circuit, and linkage from said lever to said generator driving means for controlling the latter and operable on pivotal movement of said lever relatively to said movable element.

2. An electric vehicle comprising a wheeled chassis, a generator thereon, a gasoline engine for driving said generator, a driving motor geared to the wheels of said vehicle and connected to said generator, a controller having fixed elements connected to said generator and motor and having a movable element adapted to make, break and reverse a circuit through said generator and motor, an operating lever pivotally attached to said movable element and movable rigidly with said movable element for adjusting the same to make, break, or reverse the circuit, and linkage from said lever to the throttle of said engine for adjusting the latter and operable on pivotal movement of said lever relatively to said movable element.

3. An electric vehicle comprising a wheeled chassis, a generator thereon, means for driving said generator, a driving motor geared to the wheels of said vehicle and connected to said generator, a controller having fixed elements connected to said generator and motor and having a movable element adapted to make, break and reverse a circuit through said generator and motor, an operating lever pivotally attached to said movable element and movable rigidly with said movable element for adjusting the same and for a pivotal movement relative to said element and linkage from said lever to said generator driving means for controlling the energy input to the latter and operable on pivotal movement of said lever relatively to said movable element.

4. An electric vehicle comprising a wheeled chassis, a generator thereon, means for driving said generator, a driving motor geared to the wheels of said vehicle and connected to said generator, a controller having fixed elements connected to said generator and motor and having a movable element adapted to make, break and reverse a circuit through said generator and motor, an operating lever attached to said movable element for adjusting the same and for pivotal movement relative to said element, linkage from said lever to said generator driving means for controlling the latter and operable on pivotal movement of said lever, a plate having a slot with two branches angular to the axis of said movable element, said lever passing through said slot and adapted for movement in the branches thereof, said branches being positioned to determine the forward and reverse positions of said movable element by reception of the lever therein respectively, the components of said branches parallel to said axis permitting actuation of said linkage.

5. An electric vehicle comprising a wheeled chassis, a generator thereon, means for driving said generator, a driving motor geared to the wheels of said vehicle and connected to said generator, a controller having fixed elements connected to said generator and motor and having a movable element adapted to make, break and reverse a circuit through said generator and motor, an operating lever attached to said movable element for adjusting the same and for pivotal movement relative to said element, linkage from said lever to said generator driving means for controlling the latter and operable on pivotal movement of said lever, a plate having a W-shaped slot with its end branches angular to the axis of said movable element and its center branch parallel to said axis, said lever passing through said slot and adapted for movement in the branches thereof, said angularly disposed branches being positioned to determine the forward and reverse positions of said movable element by reception of said lever therein respectively, and said parallel branch being positioned to determine the neutral position of said movable element by reception of the lever therein, the components of said branches parallel to said axis permitting actuation of said linkage.

HAROLD D. GUMPPER.